United States Patent

Haynes

[15] 3,670,765

[45] June 20, 1972

[54] LIQUID LEVEL SENSOR INCORPORATING PULSE TECHNIQUES

[72] Inventor: Joel E. Haynes, 11735 Luanda, Lakeview Terrace, Calif. 91342

[22] Filed: July 27, 1970

[21] Appl. No.: 58,507

[52] U.S. Cl............................................................137/392
[51] Int. Cl..........................................................G05d 9/12
[58] Field of Search..........................137/386, 389, 392, 387; 340/244 C

[56] References Cited

UNITED STATES PATENTS

| | | | |
|---|---|---|---|
| 3,037,165 | 5/1962 | Kerr | 340/244 C |
| 3,254,333 | 5/1966 | Baumoel | 340/244 C |
| 3,392,349 | 7/1968 | Bartley | 340/244 C |

Primary Examiner—M. Cary Nelson
Assistant Examiner—David R. Matthews
Attorney—Nilsson, Robbins, Wills & Berliner

[57] ABSTRACT

A system is disclosed for sensing levels of electrically-conductive liquid by utilizing the liquid as a switch in cooperation with electrical probes. The destructive effects of liquid conduction on the probe are avoided by the use of pulse techniques. A pulse generator operates when the liquid under observation attains a probe-contact level to complete an electrical circuit. The pulse generator is disclosed in the form of a relaxation oscillator which pulses a trigger circuit, the output of which is integrated to provide a control signal. A plural-probe system is also disclosed. The pulses provided from the pulse generator have an interval of not more than one fifth of the interval therebetween.

6 Claims, 3 Drawing Figures

INVENTOR.
JOEL E. HAYNES

By Nilsson, Robbins, Wills & Berliner
Attorneys.

LIQUID LEVEL SENSOR INCORPORATING PULSE TECHNIQUES

BACKGROUND AND SUMMARY OF THE INVENTION

In a wide variety of automated control systems, it becomes necessary to sense at least one predetermined level of an electrically-conductive liquid. Although such liquid may offer a rather substantial resistance to the flow of electrical current (as somewhat pure water) as used herein the term "conductive liquid" simply identifies liquids that are capable of carrying sufficient electrical current to indicate contact with a probe.

In the past, several systems have been proposed to detect the presence (or absence) of a conductive liquid at a specific location, by energizing a probe with an electrical potential and detecting the change in current through the probe upon contact with the liquid. Prior conventional systems of this type have frequently utilized transformers to isolate the current that flows through the liquid from the principal power source. For example, transformers have been employed in prior systems to reflect a change of impedence into a primary circuit when the secondary circuit is connected in a closed loop through the liquid. Of course, several variations of such systems have been used in the past wherein continuous current (A.C. or D.C.) is developed through at least one probe and the liquid in order to perform the sensing operation.

Although liquid-level detection systems, as considered above, have come into widespread use, certain problems have been attendant such use. Specifically, the probes which contact the conductive liquid tend to deteriorate rather rapidly. If the current flow through a probe is positive with reference to the liquid, electrolysis gradually deteriorates the probe to a point of eventual failure. Conversely, if the current through the probe is negative, minerals are deposited on the probe again resulting in deterioration and eventual failure. The use of alternating current in conventional prior systems does not result in a balance but rather deterioration still occurs, depending upon the type of liquid and the manner of operation.

To avoid deterioration of the probes, in conventional liquid-level sensing systems, it has been proposed to reduce the operating current and also to plate the probes with valuable metal, e.g., gold or silver. Although these techniques have, to some extent, reduced the problem, it remains a major concern in the operation of liquid detection systems.

In general, the present system utilizes an oscillator or pulse generator having a relatively-low duty cycle wherein the interval of pulses is substantially less than one half of the cyclic period of the oscillator. By incorporating such an oscillator with a probe arrangement, and structure for processing the output of the oscillator, effective sensing operations can be performed with average currents through the liquid in the range of a few nanoamps. Accordingly, probe deterioration is extremely low and need not be considered a primary maintenance problem.

BRIEF DESCRIPTION OF THE DRAWINGS

In the drawings which constitute a part of this specification, exemplary embodiments demonstrating various objectives and features hereof are set forth, specifically.

DESCRIPTION OF THE ILLUSTRATIVE EMBODIMENT

As required, detailed illustrative embodiments of the invention are disclosed herein. The embodiments exemplify the invention which may, of course, be embodied in other forms, some of which may be radically different from those illustrated herein. However, the specific structural and functional details as disclosed herein are representative and they provide a basis for the claims herein which define the scope of the invention.

Figure 1:
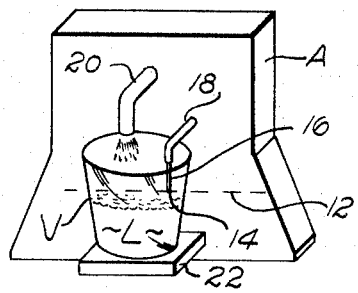
FIG. 1 is a perspective view of a liquid-handling apparatus incorporating the present invention.

Referring initially to FIG. 1, there is shown a vessel V for receiving liquid L dispensed by an apparatus A to a predetermined level in the vessel V. Specifically, the predetermined level is indicated by a dashed line 12 and is defined by the tip 14 of a probe 16. The probe passes through a sleeve 18 into the housing of the apparatus A. Accordingly, in the operation of the structure as depicted, liquid L is dispensed from a spigot 20 into the vessel V until the liquid level reaches the probe tip 14. The desired lequid level is sensed as a result of electrical current flowing through a circuit including: the probe 16, the liquid L, the vessel V and an electrical system contained within the apparatus A as disclosed below.

On removal of the vessel V, from a platform 22, the apparatus A remains quiescent until the vessel V (presumably empty) is returned to the platform 22 depressing it and actuating the apparatus A to initiate another filling operation. Of course, the apparatus as depicted in FIG. 1, is illustrative of only one exemplary application for the liquid control system hereof. That is, it is to be recognized that the system hereof may be adapted for a wide variety of different applications involving a wide variety of different fluids and automated arrangements.

Figure 2:
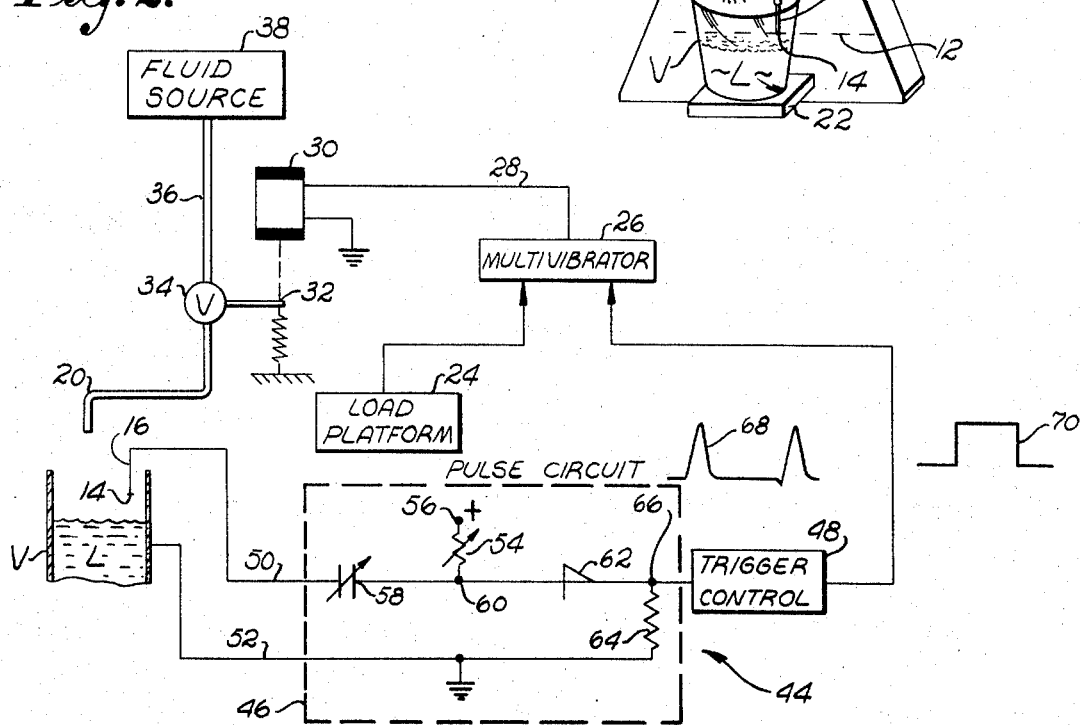
FIG. 2 is a diagrammatic representation of the liquid control system embodied in the apparatus of FIG. 1.

Considering the operation of the system of FIG. 1 in somewhat greater detail, reference will now be made to FIG. 2, wherein the vessel V and the liquid L are represented somewhat diagrammatically in relation to the similarly-depicted probe 16 and spigot 20. The load platform 22 (FIG. 1) is incorporated in a load platform unit 24 (FIG. 2) which incorporates a momentary contact switch and a source of current for providing an output pulse when the platform 22 is depressed by the placement of a vessel V thereon. The pulse from the unit 24 sets a multivibrator 26 to provide a current through a conductor 28 to energize a solenoid 30 which moves a control arm 32 to open a valve 34, contained in a duct 36 connecting a fluid source 38 to the spigot 20. The valve 34 is biased to a closed position by a spring 42 connected to the arm 32. Accordingly, unless the solenoid 30 is energized, the arm 32 is moved downwardly (as indicated) by the spring 42 to close the valve 34.

Recapitulating, the multivibrator 26 is set in a state to open the valve 34 when the vessel V actuates the load platform unit 24. The multivibrator 26 is then reset (permitting the valve 34 to close) when the liquid sensing system (generally indicated at 44) detects the presence of liquid in contact with the tip 14 of the probe 16.

The system 44 includes an oscillator or pulse circuit 46 and a trigger circuit 48. The pulse circuit 46 comprises a relaxation oscillator and incorporates the vessel V and the probe 16 as switched elements along with the liquid L. That is, the probe 16 and the vessel V define an open circuit between conductors 50 and 52, the closure of which actuates the pulse circuit 46.

As indicated above, the pulse circuit 46 is a form of relaxation oscillator in that a non-sinusoidal waveform is developed by first charging, then quickly discharging a reactance through a resistor. Specifically, a variable resistor 54 is connected from a source of positive potential (applied at a terminal 66) through a variable capacitor 58 to the probe 16. The vessel V (electrically conductive) is the connection from the liquid L through the conductor 52 to ground. A junction point 60 between the resistor 54 and the capacitor 58 is connected through a breakover diode 62 and a resistor 64 to ground potential. The junction point 66, between the diode 62 and the resistor 64, is connected to the input of the trigger circuit 48.

In the operation of the pulse circuit 46, consider initially the quiescent state when the liquid L has not attained the level of the probe 16 with the result that an open circuit exists between the conductors 50 and 52. As a consequence, current may not flow from the terminal 56 to ground potential through the resistor 54 and the capacitor 58. Similarly, in view of the characteristics of the breakover diode 62, neither may current flow through the resistor 54, the diode 62 and the resistor 64 to ground potential. That is because the diode 62 requires a threshhold voltage thereacross supported by a minimum threshhold current to sustain conduction. The values of the resistors 54 and 64 are such that insufficient supporting current is available to sustain the diode 62 in conduction.

When the liquid L attains the level of the probe 16, an essentially closed circuit is provided between the conductors 50 and 52. Thereupon, a current flows through the resistor 54, a capacitor 58, a probe 16 and the liquid L to charge the capacitor 58. When the charge across the capacitor 58 attains a predetermined level (potential appearing at the junction point 60) the breakover diode 62 becomes conductive, which conduction is supported by the discharge of the capacitor 58 provide a voltage spike as indicated by the waveform 68, at the junction point 66. As a consequence of the voltage spike, the trigger circuit 68 is actuated to provide a shaped pulse 70 which resets the multivibrator 26 to de-energize the coil 30, thereby allowing the spring 42 to close the valve 34 through the level arm 32.

Although the multivibrator 26 is not affected by repeated pulses from the trigger 48, it is contemplated that promptly after the valve 34 is closed, the vessel V will be removed, again resulting in an open circuit between the conductors 50 and 52 and placing the pulse circuit 46 in a quiescent state.

While operative, the pulse circuit 46 has a particularly low duty cycle. In fact, it has been found desirable to preserve the duration of pulses 58 less than one-fifth the duration of the interval between such pulses in the cyclic operation of the pulse circuit 46.

Depending upon the nature of the liquid L, it may be desirable to provide the resistor 54 and/or the capacitor 58 in a variable form, as shown. By providing such control, the output from the pulse circuit 46 may be controlled to attain the desired characteristic in various applications.

As described, the system above utilizes a single probe along with mechanical actuation (load platform unit 24) to control the filling of the vessels V. Although such a system may have various applications, the need also exists for a multiple-probe system as for maintaining a liquid level between the tips of two probes. Such a system is shown in FIG. 3 and will now be considered in detail.

Figure 3:
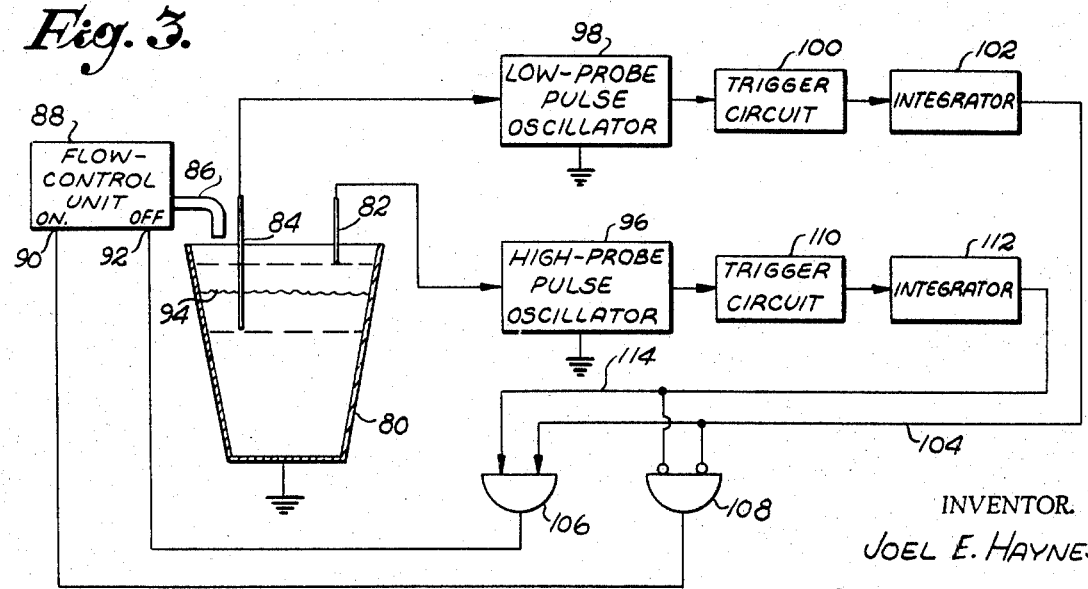
FIG. 3 is a diagrammatic view of an alternative liquid control system incorporating the principles of the present invention.

A vessel 80, as shown in FIG. 3, is connected to ground and has two liquid levels defined therein by the lower tip ends of probes 82 and 84. The vessel 80 is positioned to receive fluid from a spigot 86 incorporated in a flow control unit 88. The flow control unit 88 is electrically controlled and in that regard has an "on" input 90 and an "off" input 92. These inputs are controlled by binary signals, with a high-signal level (pulse) at the input 90 actuating the unit to provide liquid from the spigot 86 and a high-signal level (pulse) at the input 92 halting the provision of liquid.

The control system of FIG. 3 operates to maintain the liquid level 94 between the lower tips of the probes 82 and 84. Accordingly, when the liquid level 94 drops below the tip of the probe 84, the unit 86 is actuated to refill the vessel 80 to the level of the tip 82. At such a level, the flow control unit is de-energized. In summary, the operation is accomplished by actuating the flow control unit 88 when neither of the probes 82 nor 84 engages fluid and maintaining the flow control unit 88 actuated until both of the probes 82 and 84 do engage fluid.

Considering the system in further detail, the probes 82 and 84 are connected respectively to a high-probe pulse oscillator 96 and a low-probe oscillator 98. The oscillator 98 is connected through a trigger circuit 100 and an integrator 102 to a conductor 104 which is in turn connected to the inputs of an "and" gate 106 and a "nand" gate 108. Somewhat similarly, the high-probe pulse oscillator 96 is connected through a trigger circuit 110, an integrator 112 and a conductor 114, also to the inputs of the "and" gate 106 and the "nand" gate 108.

Gates satisfactory for use as the "and" gate 106 and the "nand" gate 108 are well known in the prior art. Functionally, the "and" gate 106 provides a high level binary output when all inputs thereto are at a high level. Conversely, the "nand" gate 108 provides a high level binary output when all the inputs thereto are at a low level. The output from the "and" gate 106 is to the "on" input 90 of the unit 88. The output from the "nand" gate 108 is to the "off" input 92 of the unit 88.

Considering the detailed operation of the system of FIG. 3, the oscillators 96 and 98 provide relatively low duty cycle pulse outputs whenever their respective probes 82 and 84 are coupled to ground through liquid contained in the vessel 80. In that regard, the oscillators 96 and 98 may comprise relaxation oscillators as previously described with reference to FIG. 2.

The relatively-low duty cycle pulses provided from the oscillators 96 and 98 are shaped into regular pulses by the trigger circuits 110 and 100, which pulses are integrated to provide binary outputs from intergrators 112 and 102 as well known in the prior art. Accordingly, it may be seen that when the fluid level 94 attains the level of the probe 82, both probes 82 and 84 are coupled to ground with the result that both the oscillators 96 and 98 are operative and high binary outputs are provided from both the integrators 102 and 112. That condition is sensed by the "and" gate 106 which supplies a high-level signal to the "off" input 92 of the unit 88 to halt the supply of further liquid through the spigot 86. The system then remains quiescent as the liquid level 94 drops variously to levels between the probes 82 and 84 until the level 94 ceases to contact the probe 84. Thereupon, both of the oscillators 96 and 98 are quiescent with the result that the trigger circuits 100 and 110 are quiescent in the output from the integrators 102 and 112 are low. That condition is detected by the "nand" gate 108 providing a high signal level to the "on" input 90 of the flow-control unit 88. As a consequence, the unit 88 is actuated to provide liquid from the spigot 86 to re-establish the level 94 of the liquid at the tip of the probe 82.

As indicated above, in various applications of the system hereof, widely different flow control patterns may be accomplished. With regard to FIG. 3, it is to be noted that during most intervals the probe 84 is operative to carry a current. In prior systems of liquid control, such a probe would have an exceedingly limited life. However, in the system hereof, the probe 84 may be expected to endure for a considerable operating time. As other important aspects hereof, it is also to be noted that the system hereof may be relatively inexpensively adapted to various applications in that relatively simple structure may be utilized without the presence of expensive transformer components. Furthermore, the system hereof affords a high degree of personnel safety in view of the pulse techniques incorporated therein. Accordingly, an improved system is provided as set forth in the following claims.

What is claimed is:

1. A liquid control system for use, as to maintain predetermined levels of an electrically-conductive liquid in a vessel, or the like, as by regulating a liquid flow means, comprising:

at least one probe means for engaging said liquid in said vessel at a predetermined level thereof to thereby provide a closed circuit path through said liquid;

oscillation means for generating pulses of relatively low duty cycle, said oscillation means defining an open circuit which inhibits the operation of said oscillation means;

means connecting said closed circuit path through said liquid across said open circuit defined by said oscillation means; and means for sensing operations of said oscillation means to thereby control said liquid flow means.

2. A system according to claim 1 wherein said oscillator means includes a reactance and a resistor and comprises a relaxation oscillator.

3. A system according to claim 1 wherein the duty cycle of said oscillator provides pulses of an interval of not more than one-fifth of the interval therebetween.

4. A system according to claim 1 wherein said means for connecting said oscillator means includes an integrator means to provide a continuous signal from said pulses.

5. A system according to claim 1 wherein said probe means comprises a first probe circuit and a second probe circuit defining different levels in said vessel; and wherein said oscillation means includes a pair of said oscillator means; and wherein said means connecting includes a pair of connecting circuits for connecting said first probe circuit across the open circuit defined by one of said oscillator means and for connecting said second probe circuit across the open circuit of another of said oscillator means; and wherein said means for connecting includes logic means connected to said pair of oscillator means to control said flow means in relation to each of said different levels in said vessel.

6. A liquid control system according to claim 1 wherein said means for sensing includes a trigger circuit means to substantially increase the duty cycle of pulses from said oscillator means.

* * * * *